United States Patent [19]
Wingler et al.

[11] 3,900,435
[45] Aug. 19, 1975

[54] PULVERULENT ACRYLIC RESIN BINDER MIXTURES CONTAINING TRIGLYCIDYL ISOCYANURATE AND CELLULOSE ACETOBUTYRATE

[75] Inventors: Frank Wingler, Leverkusen; Richard Muller, Bergisch-Neukirchen, both of Germany

[73] Assignee: Bayer Aktiengesellschaft, Germany

[22] Filed: Apr. 2, 1974

[21] Appl. No.: 457,258

[30] Foreign Application Priority Data
Apr. 7, 1973  Germany............................ 2317578

[52] U.S. Cl................ 260/17; 117/17; 117/93.4 R; 117/132 B
[51] Int. Cl. ........................ B05b 5/02; C08b 21/08
[58] Field of Search .................................. 260/17 R

[56] References Cited
UNITED STATES PATENTS
3,740,367  6/1973  Winkelblech............... 260/29.6 TA
3,784,501  1/1974  Pettit ................................ 260/851
3,803,111  4/1974  Munro ................................ 260/17
3,836,604  9/1974  Hagemann......................... 260/836

Primary Examiner—Melvin Goldstein
Assistant Examiner—Edward Woodberry
Attorney, Agent, or Firm—Connolly and Hutz

[57] ABSTRACT

Copolymers of 23 to 92% by weight of methyl methacrylate, 5–62% by weight of an acrylic acid ester containing from 1 to 12 carbon atoms in the ester portion or a methacrylic acid ester containing from 2 to 12 carbon atoms in the ester portion and 3 to 15% by weight of unsaturated copolymerizable carboxylic acids are homogeneously mixed with triglycidyl isocyanurate, cellulose acetobutyrates and optionally with pigments and levelling agents. The mixture may be applied by electrostatic powder-spraying or other powder coating processes to suitable surfaces and cured at temperatures of about 130° to 220°C. The backed films of the mixture show outstanding adherence to the substrate and hardness coupled with elasticity, high gloss and weather resistance.

4 Claims, No Drawings

PULVERULENT ACRYLIC RESIN BINDER MIXTURES CONTAINING TRIGLYCIDYL ISOCYANURATE AND CELLULOSE ACETOBUTYRATE

This invention relates to binder mixtures which are pourable in powder form, based on acidic acrylic resins, triglycidyl isocyanurate and acetobutyrates.

It is known from German Auslegeschrift No. 1,180,373 that triglycidyl isocyanurate may be reacted with polycarboxylic acid to produce cross-linked products.

It is also known, from British Pat. Specification No. 773,206, to use solution polymers of styrene, acrylic acid and butyl acrylate in combination with triglycidyl cyanurate as binders for solvent-containing lacquers. The binders used for a solvent-containing lacquer system are not necessarily suitable for the electrostatic powder spray process because this process requires the binder to have particular properties.

Powder lacquers, based on polyepoxides, which substantially fulfil the above requirements are known, but their resistance to weathering is for many purposes insufficient. This unsatisfactory weathering resistance of epoxide powder lacquers stimulated the development of powder lacquers based on acrylates. Acrylate powder resins of this kind have been described, for example, in French Pat. Specification No. 2,035,185. Methyl methylol ether groups firmly anchored in the molecule enable these resins to be cross-linked by the action of heat. However, these resins are not sufficiently stable in storage at the high temperatures which may occur, e.g., during transport in hot countries. The resins usually begin to form lumps at 40°C and are then no longer pourable. Permanent pourability is, however, a prerequisite for any powder application process.

Pourable binder mixtures for use in the electrostatic powder spray process have been disclosed in German Offenlegungsschrift No. 2,127,684. These mixtures may be obtained from an acid acrylic resin, (consisting of copolymerised units of styrene, acrylic or methacrylic acid esters and unsaturated polymersiable carboxylic acids), triglycidyl isocyanurate and optionally pigments and levelling agents. One disadvantage of these mixtures is that they are still not sufficiently resistant to weathering.

It is an object of this invention to provide binder mixtures for the electrostatic powder spray or other powder coating processes from acidic acrylic resins and triglycidyl isocyanurate which are more resistant to weathering.

The problem has been solved by using binder mixtures of (A) copolymers of methyl methacrylate, acrylic acid esters, containing from 1 to 12 carbon atoms in the alcohol group, or methacrylic acid esters, containing from 2 to 12 carbon atoms in the alcohol group, acrylic acid, methacrylic acid, itaconic acid, maleic acid or fumaric acid, or mixtures thereof, (B) triglycidyl isocyanurate and (C) cellulose acetobutyrates. It is surprising that the required properties which are important for the electrostatic powder spray process, e.g. good pourability at temperatures up to 50°C, low melt viscosity above 100°C, good levelling characteristics on the article which is to be lacquered and high surface hardness and gloss after stoving with a hardener could be obtained with the binders of the present invention in spite of the fact that no styrene units are incorporated into the copolymers.

The present invention relates to binder mixtures suitable for the electrostatic spray process which are pourable at temperatures up to 50°C, have a particle size of from 30 to 120 $\mu$ and are based on triglycidyl isocyanurate, acidic acrylic resins and optionally auxiliary agents, characterised in that the binder mixtures consists of (A) polymerised units of I from 23 to 92 % by weight of methyl methacrylate,
II from 5 to 62 % by weight of an acrylic acid ester which contains from 1 to 12 carbon atoms in the ester portion or a methacrylic acid ester which contains from 2 to 12 carbon atoms in the ester portion or mixtures thereof and
III from 3 to 15 % by weight of acrylic acid, methacrylic acid, itaconic acid, maleic acid or fumaric acid or mixtures thereof such that the sum of the percentage contents of I to III amounts to 100 and the average molecular weight is from 3,000 to 20,000, B. triglycidyl isocyanurate,
C. cellulose acetobutyrates, and, optionally,
D. auxiliary agents, e.g., pigments and levelling agents, the mixture containing from 95 to 80 parts by weight of acrylic resin (A), from 5 to 20 parts by weight of triglycidyl isocyanurate (B), from 5 to 40 % by weight, based on (A), of cellulose acetobutyrates (C) and, optionally, up to 150 % by weight, based on (A) and (B), of pigments and from 0.1 to 40 % by weight, based on (A), of levelling agents.

Duroplastic binders for the electrostatic powder spray or other powder coating processes should, in their uncross-linked state, be brittle, easily powdered resins which remain pourable as powders at temperatures up to 50°C and do not form lumps. After application such as electrostatic application the powders should flow smoothly on their support at temperatures of from 80° to 120°C and harden at temperatures of 130°C and upwards (to ca. 220°C) to insoluble, infusible coatings. In addition, the powders must be capable of being electrostatically charged and of holding the electrostatic charge on metal objects for some time until the stoving or hardening process is carried out. Furthermore, these binders must not undergo premature cross-linking near their melting points because they are generally mixed with pigments, catalysts and levelling agents in the molten state at temperatures of approximately 100°C.

If an external cross-linking agent is used, as in the process of the present invention, the component which acts as cross-linking agent must melt at the same temperature as the resin and it must be compatible and homogeneously miscible with the resin and the additives. When the mixture solidifies, the added cross-linking agent must not reduce the storage stability at temperatures of up to 50°C nor may the system separate into its components when cold. After it has been spread out and stoved, the compatible mixture of cross-linking agent, resin and additives should form a high gloss coating which is resistant to chemicals, solvents and weathering.

The term "acidic acrylic resins" as used herein, is to include not only copolymers which have the composition indicated above, but also mixtures of copolymers provided the mixture is prepared in such a way that the overall composition lies within the limits indicated above.

The preparation of the copolymers may be carried out by conventional methods of solvent-free, solution, suspension or bead polymerisation, preferably by solution or solvent-free polymerisation. Processes of this type have been described, for example, in "Methoden der Organischen Chemie", Houben-Weyl, 4th Edition, Volume 14/1, pages 24–556 (1961).

If polymerisation is carried out in solution, solvents, e.g., methylene chloride, ethanol, isopropanol, n-propanol, n-butanol, isobutanol, t-butanol, methyl, ethyl, propyl or butyl acetates, acetone, methyl ethyl ketone, benzene, xylene, and toluene, may be used.

The polymerisations are carried out at temperatures of from 40° to 180°C.

The following are examples of initiators which may be used in quantities of from 0.5 to 3 %, by weight, based on the monomers: percarbonates, peresters, e.g., t-butyl perpivalate or peroctoate, benzoyl peroxide, o-methoxy benzoyl peroxide, di-tert.-butylperoxide, dichlorobenzoyl peroxide and azodiisobutyric acid dinitrile.

The conventional molecular weight regulators, e.g., thioglycol, thioglycerol or t-dodecyl mercaptan may also be added.

The copolymer solution is freed from solvents at temperatures of from 90° to 180°C in a suitable apparatus, for example in evaporator screws, for example by the process described in U.S. Pat. Specification No. 3,741,272, and is then cooled, granulated and ground. Isolation of the copolymer may, however, also be achieved by other methods, for example by spray drying, removal of the solvent with steam and at the same time dispersing the copolymer in water or by the method, described in German Offenlegungsschrift No. 2,008,711, of precipitating the copolymer from a solvent which is miscible with water.

After they have been isolated, the copolymers are mixed with up to 150 % by weight, preferably up to 100% by weight of inorganic or organic pigments and with from 5 to 40 % by weight, based on the copolymer, of cellulose acetobutyrates, at temperatures of from 80° to 120°C. The following are examples of suitable pigments: titanium dioxide, iron oxides, chromium oxide, phthalocyanine and azo pigments.

The cellulose acetobutyrates are white, fine-grained powders with an acetate group content of from 5 to 40 %, by weight, a butyrate content, calculated as butyric acid, of from 10 to 58 %, by weight, and a melting range of from 120° to 200°C.

Cellulose acetobutyrates which have an acetyl content of from 10 to 20 %, a butyryl content, calculated as butyric acid, of from 30 to 50 % by weight, a melting range of from 120° to 160°C and a viscosity of from 10 to 500 poises, determined on a 25 % butyl acetate solution at 23°C in a rotary viscometer, are preferred. They are used in quantities of from 5 to 40 % by weight, preferably from 10 to 30 %, by weight, based on binder (A).

According to a preferred embodiment of the present invention, the acrylic resins consist of from 5 to 15 % by weight, acrylic acid and/or methacrylic acid, from 5 to 10 % by weight, methyl acrylate and/or ethyl acrylate and from 90 to 75 %, by weight, methyl methacrylate. The resins have acid numbers of from 32 to 120 mg of KOH per g of substance.

In addition, from 0.1 to 40 %, by weight, based on copolymer (A), of levelling agents or plasticisers, e.g., silicones, polyesters, oligomeric acrylates, phosphoric acid esters, phthalic acid esters and adipic acid esters may be added to the melts. These auxiliary agents, however, may only be added in such quantities that the powders remain pourable at 50°C.

Catalysts and accelerators, e.g., t-amines, Lewis acids, e.g., boron trifluoride adducts, and oil-soluble metal compounds, e.g., dibutyl tin dioctoate may also be added to the mixtures.

Pigments, levelling agents and plasticisers may, of course, be added to the copolymer solution either before polymerisation of the monomers or, in the case of solution polymerisation, after polymerisation and before removal of the solvent.

The incorporation of the triglycidyl isocyanurate into the mixture is preferably carried out in a mixing screw at temperatures of from 80° to 120°C at the same time that the pigments, levelling agents and catalysts are added. The mixing time should be from 0,5 to 10 minutes. If mixing is prolonged beyond this time, the product starts to undergo cross-linking. If these conditions are observed, a homogeneous mixture is obtained which will not separate into its components on cooling.

The solvent-free, optionally pigmented, mixtures which are brittle in the uncross-linked state when cold are ground down to fine particles of from 30 to 120 $\mu$ and may, if desired, be sifted according to their grain size.

The polymer powders to be used according to the present invention are still pourable at temperatures of 50°C, are fluid enough to spread out on surfaces at temperatures of from 80° to 120°C and are preferably hardened or stoved at temperatures of from 160° to 180°C for from 15 to 30 minutes, during which time cross-linking takes place.

The average molecular weights of the polymer powders are from 3,000 to 20,000, determined in an organic solvent by the method of measuring the reduction in vapour pressure.

Application of the powders to suitable supports and particularly to metals is carried out by conventional methods e.g., of the electrostatic powder spray process, (40 to 90 KV), see D. R. Davis "Coating with elektrostatic dreyspray", in Plastics Technology, June 1962, pages 37–38.

The stoved films, (thicknesses from 40 to 300 $\mu$), of the polymer powders used according to the present invention combine excellent adherence to their substrate and hardness with elasticity. They are also distinguished by their high gloss and resistance to weathering.

The powders may be used for coating domestic articles, metal parts in the construction of motor vehicles, metal parts which are exposed to severe weathering conditions, e.g. motorcar bodies, metal facades, pipes, wire netting and machinery used for forestry and agriculture.

Methods of preparing the powders and their use as powders which may be electrostatically sprayed are described in the following Examples. The parts and percentages given in the Examples are parts and percentages by weight unless otherwise indicated.

EXAMPLE 1

400 g dibutyl phthalate, 860 g methyl methacrylate, 90 g methacrylic acid, 50 g methyl acrylate and 20 g t-dodecyl mercaptan are introduced into a vessel equipped with spiral stirrer under an atmosphere of nitrogen and heated to the reflux temperature. 10 g t-butyl perpivalate in the form of a 75 % dichloroethane solution are then introduced, with stirring over a 60 minute period and the reaction temperature is raised to 160°C. 4 g di-t-butyl peroxide are stirred in and after 30 minutes the volatile constituents are evaporated off in an oil pump vacuum, (up to approximately $10^{-1}$ mm.Hg) at 180°C. 200 g of low molecular weight cellulose acetobutyrate, having an acetyl content of 13.6 %, a butyryl content, calculated as butyric acid, of 38 %, a melting range of from 140° to 160°C and a viscosity of 70 poises, determined on a 25 % butyl acetate solution at 23°C in a rotary viscometer are now stirred into the melt at 160°C and the melt is then cooled by pouring it out onto a metal sheet. The solidified melt is then powdered. The acid number of the powder is 36 mg of KOH per g of substance.

32 g of the above described resin, 0.2 g oligomeric acrylate, (consisting of 70 parts by weight of ethyl hexyl acrylate and 30 parts by weight of ethyl acrylate) 16 g Rutile type titanium dioxide and 1.2 g triglycidyl isocyanurate are then mixed at 100°C for 1 minute, in a preheated kneader with a capacity of 200 ml and the mixture is then solidified by pouring it on to a cold metal sheet. The mixture is ground to a particle size of less than 100 $\mu$ in a pin mill. The mixture remains pourable at 50°C. The powder is sprayed electrostatically on to degreased phosphatised steel sheets, using a voltage of 40 KV, and then stoved at 180°C for 30 minutes. A high gloss, pure white coating is obtained which is not subject to yellowing and shows no signs of either chalking or loss of gloss after 1000 hours weathering in the weatherometer. The lacquer coating is resistant to the usual mineral spirits as well as to aromatic hydrocarbons.

The pencil hardness is 4 H and the Erichsen cupping according to DIN 53 156 is 5 mm.

EXAMPLE 2

Example 1 was repeated but using different quantities of monomers.

The following quantities were used:
400 g dibutyl phthalate, 800 g methyl methacylate, 140 g methacrylic acid, 50 g methyl acrylate and 10 g dodecyl methacrylate. The polymerised resin described in Example 1 is mixed with 200 g of a cellulose acetobutyrate which has the same constants.

The acid number of the mixture was 55 mg of KOH per g of substance.

50 g of resin were mixed with 25 g titanium dioxide, 0.5 g oligomeric acrylate and 3 g triglycidyl isocyanurate in a kneader at 100°C and then worked-up to a powder as described above.

A lacquer coating which had been stoved at 180°C for 30 minutes showed no signs of yellowing, had a hardness of 4 H and an Erichsen cupping of 7 mm and showed no reduction in gloss after 1000 hours in the weatherometer. The lacquer coating is also resistant to mineral spirits and aromatic hydrocarbons. The gloss is 98°C on the Gardner scale.

We claim:

1. A powdered coating agent comprising a mixture of
   A. a copolymer of
      I. 23 to 92% by weight of methyl methacrylate,
      II. 5 to 62% by weight of an acrylic acid ester having from 1 to 12 carbon atoms in the ester portion or a methacrylic acid ester having from 2 to 12 carbon atoms in the ester portion or a mixture thereof and
      III. 3 to 15% by weight of acrylic acid, methacrylic acid, itaconic acid, maleic acid or fumaric acid or a mixture thereof,
   wherein the sum of the percentage contents of I to III is 100 and the average molecular weight is from about 3,000 to 20,000,
   B. triglycidyl isocyanurate and
   C. cellulose acetobutyrate
   wherein there are 95 to 80 parts by weight of said copolymer (A) to 5 to 20 parts by weight of triglycidyl isocyanurate (B) and 50 to 40% by weight, based on (A), of cellulose acetobutyrate (C).

2. The powdered coating agent of claim 1 containing up to 150% by weight, based on the weight of (A) and (B), of a pigment.

3. The powdered coating agent of claim 1 containing from 0.1 to 40% by weight, based on the weight of (A), of at least one levelling agent selected from the group consisting of silicones, polyesters, oligomeric acrylates, phosphoric acid esters, phthalic acid esters and adipic acid esters.

4. The powdered coating agent of claim 1 wherein said cellulose acetobutyrate has an acetate group content of from 5 to 40% by weight, a butyrate content, calculated as butyric acid, of from 10 to 58% by weight and a melting range of from 120° to 200°C.

* * * * *